(12) United States Patent
Martinez Torres et al.

(10) Patent No.: US 11,745,387 B1
(45) Date of Patent: Sep. 5, 2023

(54) METHOD OF MANUFACTURING A COMPOSITE MATERIAL THAT IS USED TO MAKE BLOCKS, BRICKS, TILES, OR PAVERS

(71) Applicants: Jose Miguel Martinez Torres, Doral, FL (US); Daniel Andres Gonzalez Guevara, Doral, FL (US); Edison David Coloma Maldonado, Doral, FL (US)

(72) Inventors: Jose Miguel Martinez Torres, Doral, FL (US); Daniel Andres Gonzalez Guevara, Doral, FL (US); Edison David Coloma Maldonado, Doral, FL (US)

( * ) Notice: Subject to any disclaimer, the term of this patent is extended or adjusted under 35 U.S.C. 154(b) by 0 days.

(21) Appl. No.: 18/174,621

(22) Filed: Feb. 25, 2023

(51) Int. Cl.
| | |
|---|---|
| *B28C 5/00* | (2006.01) |
| *B28B 3/00* | (2006.01) |
| *C08K 3/105* | (2018.01) |
| *C08J 5/00* | (2006.01) |
| *C08J 3/20* | (2006.01) |
| *C08J 3/00* | (2006.01) |

(52) U.S. Cl.
CPC ............... *B28C 5/003* (2013.01); *B28B 3/00* (2013.01); *C08J 3/005* (2013.01); *C08J 3/203* (2013.01); *C08J 5/00* (2013.01); *C08K 3/105* (2018.01)

(58) Field of Classification Search
CPC .. B28C 5/003; B28B 3/00; C08J 3/005; C08J 3/203; C08J 5/00; C08K 3/105
See application file for complete search history.

(56) References Cited

U.S. PATENT DOCUMENTS

2016/0107939 A1\* 4/2016 Monkman ............... C04B 28/04
366/12

FOREIGN PATENT DOCUMENTS

CA 2071519 A1 \* 5/1991

\* cited by examiner

*Primary Examiner* — Charles Cooley
(74) *Attorney, Agent, or Firm* — Ruben Alcoba, Esq.

(57) ABSTRACT

A method of manufacturing a composite material that is used to make blocks, bricks, tiles, or payers. The method comprises of making a liquid conglomerate material, of making a solid conglomerate material, of mixing the liquid conglomerate material and the solid conglomerate material together to make the composite material, and lastly of pressing the composite material into either a block, a brick, a tile, or a paver.

2 Claims, 1 Drawing Sheet

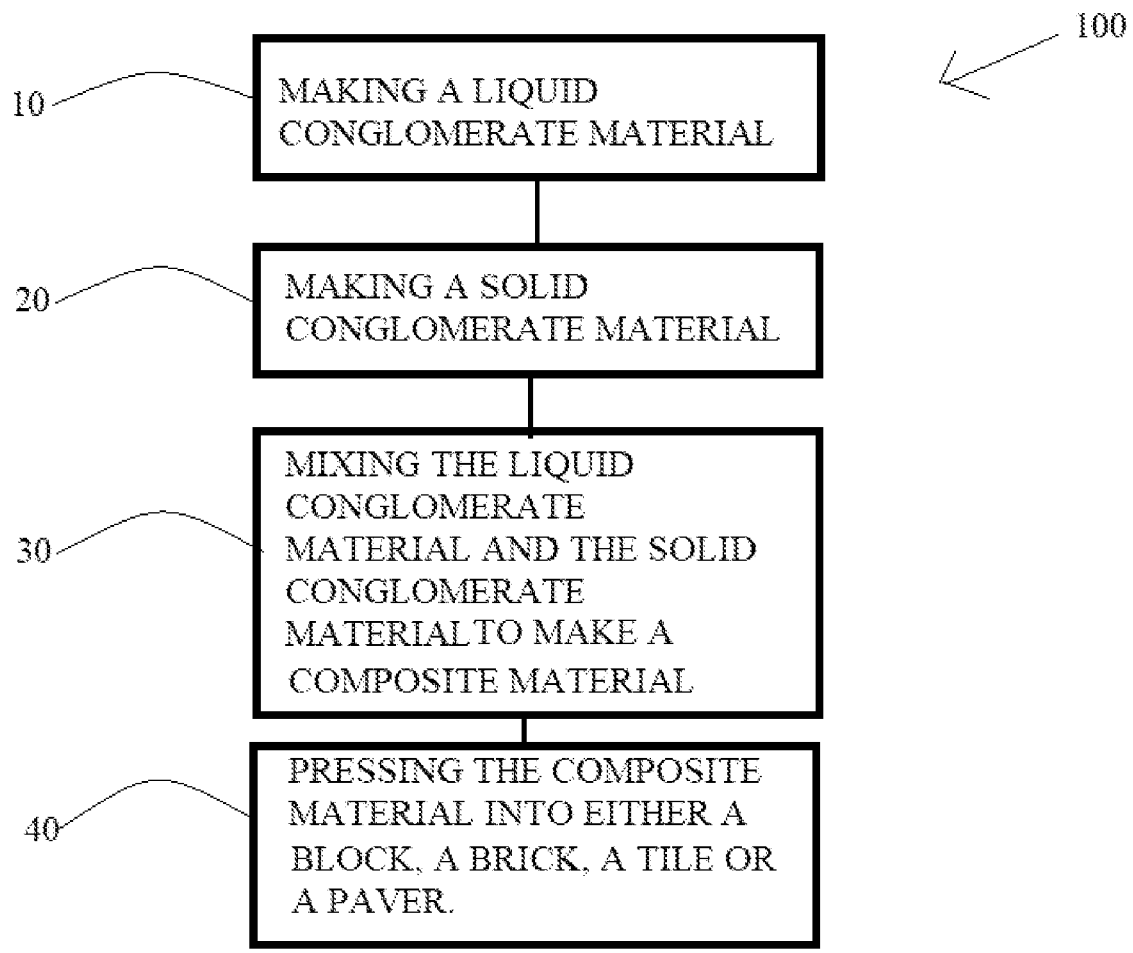

METHOD OF MANUFACTURING A COMPOSITE MATERIAL THAT IS USED TO MAKE BLOCKS, BRICKS, TILES, OR PAVERS

BACKGROUND

The present invention is a method of manufacturing a composite material that is used to make blocks, bricks, tiles, or pavers.

The inventors of the present invention are manufactures that wanted to reduce the costs normally associated with making blocks, bricks, tiles, or pavers.

They realized that one of the largest costs associated with the manufacturing of the blocks, bricks, tiles, or pavers was the transportation costs associated with taking the raw materials, the soil, needed to their manufacturing plant.

So, present invention was initially devised to reduce that transportation costs associated with the transportation of the soil needed to make the blocks, bricks, tiles, or pavers to the manufacturing plant.

Yet, during the development of the present invention, the inventors realized that not only had they reduced the normal costs associated with the manufacturing of the blocks, bricks, tiles, or pavers, that they had also invented a superior composite material to make the blocks, bricks, tiles, or pavers.

The present invention eliminated the need to transport soil to a manufacturing plant that manufactures blocks, bricks, tiles, or pavers, while also providing a superior composite material to make blocks, bricks, tiles, or pavers.

SUMMARY

The present invention is a method of manufacturing a composite material 100 that is used to make blocks, bricks, tiles, or pavers.

As seen in FIG. 1, the method comprises of making a liquid conglomerate material 10, of making a solid conglomerate material 20, of mixing the liquid conglomerate material and the solid conglomerate material together to make the composite material 30, and lastly of pressing the composite material into either a block, a brick, a tile, or a paver 40.

An object of the present invention is to provide a composite material that will use the land in which it is manufactured to either make a block, a brick, a tile, or a paver.

Yet, another object of the present invention is to reduce the cost of making the composite material by using the soil from the land in which the composite material is manufactured to either make blocks, bricks, tiles, or pavers.

Yet still, another object of the present invention is to conserve energy when making the composite material of the present invention, this is accomplished by eliminating the energy used to transport the soil needed to the manufacturing plant that manufactures the blocks, the bricks, the tiles, or the pavers.

BRIEF DESCRIPTION OF THE DRAWINGS

These and other features, aspects, and advantages of the present invention will become better understood with regards to the following description, appended claims, and drawings where the sole figure is a flowchart that summarizes the steps of the present invention.

DESCRIPTION

The present invention is a method of manufacturing a composite material that is used to make blocks, bricks, tiles, or pavers.

The method comprises the steps of providing a plastic resin that is water impermeable and that is free of chloride. Providing a vinyl acrylic emulsion that has fifty percent of solids. Providing a mixer. Mixing the plastic resin and the acrylic vinyl emulsion for at least five minutes in the mixer thereby creating a liquid conglomerate material, the liquid conglomerate material consists of, by volume, sixty percent of the acrylic vinyl emulsion and forty percent of the vinyl acrylic emulsion. Providing a blended cement material that consists of, by weight, between 15 percent to thirty-five percent of a pozzolanic material, four percent of a gypsum material, and a clinker material, the blended cement will have a total weight of one hundred percent. Providing a hydrated lime material. Providing a natural dye material. Providing an industrial mixer. Mixing the blended cement material, the hydrated lime material, and the natural dye material for at least five minutes in an industrial mixer thereby creating a solid conglomerate material, the solid conglomerate material consists of eighty percent of the blended cement material, fifteen percent of the hydrated lime material, and five percent of the natural dye material. Providing a soil material. Providing a water material. Finding a site of where to install a manufacturing plant that will manufacture the composite material, the site is chosen based on the soil material that covers the site. Analyzing the soil of the site to determine if the soil is adequate to make the composite material. Choosing the site if the soil on the site is thirty percent of a clay soil, forty-five percent of a silt-type soil, and twenty-five percent of a coarse sand that is between three mm to 4 mm thick. Preparing the soil so that is has a humidity that is from at least six percent to at most seven percent humidity. Providing a mixer mill. Mixing the soil and the solid conglomerate for at least five minutes in the mixer mill, thereby creating a soil and solid conglomerate mix, the soil and solid conglomerate mix consists of eighty-five percent of the soil and fifteen percent of the solid conglomerate material by weight. Mixing the liquid conglomerate material with the soil and solid conglomerate mix for at least five minutes at a humidity that is at least nine percent to ten percent moisture, thereby creating the composite material, the composite material consists of eighty-five percent of the soil and solid conglomerate mix and fifteen percent of the liquid conglomerate material. Providing an industrial press. And, pressing the composite material in the industrial press at a pressure that is at least 2800 pounds per square inch to either form either a block, a brick, a tile, or a paver. In a preferred embodiment, the method comprises the step of placing either the block, the brick, the tile, or the paver in a setting area for a period of forty-eight hours and sprinkling either the block, the brick, the tile, or the paver with the water material.

An advantage of the present invention is that it provides a composite material that uses the land in which it is manufactured to either make a block, a brick, a tile, or a paver.

Yet another advantage of the present invention is that it reduces the cost of making the composite material by using the soil from the land in which the composite material is manufactured to either make blocks, bricks, tiles, or pavers.

Yet still another advantage of the present invention is that it conserves energy when making the composite material of the present invention, this is accomplished by eliminating the energy used to transport the soil needed to the manufacturing plant that manufactures the blocks, the bricks, the tiles, or the pavers.

While the inventor's description contains many specificities, these should not be construed as limitations of the method of manufacturing a composite material that is used to make blocks, bricks, tiles, or pavers but rather as an exemplification of several preferred embodiments thereof, any other variations may be possible. Accordingly, the scope should be determined not by the embodiments illustrated, but by the specification, the drawings, and the claims and any legal equivalent thereof.

What is claimed is:

1. A method of manufacturing a composite material that is used to make blocks, bricks, tiles, or pavers, the method comprises the steps of:
   providing a plastic resin that is water impermeable and that is free of chloride;
   providing a vinyl acrylic emulsion that has fifty percent of solids;
   providing a mixer;
   mixing the plastic resin and the acrylic vinyl emulsion for at least five minutes in the mixer, thereby creating a liquid conglomerate material, the liquid conglomerate material consists of, by volume, sixty percent of the acrylic vinyl emulsion and forty percent of the vinyl acrylic emulsion;
   providing a blended cement material that consists of, by weight, between 15 percent to thirty-five percent of a pozzolanic material, four percent of a gypsum material, and a clinker material, the blended cement will have a total weight of one hundred percent;
   providing a hydrated lime material;
   providing a natural dye material;
   providing a mixer;
   mixing the blended cement material, the hydrated lime material, and the natural dye material for at least five minutes in the mixer, thereby creating a solid conglomerate material, the solid conglomerate material consists of eighty percent of the blended cement material, fifteen percent of the hydrated lime material, and five percent of the natural dye material;
   providing a soil material;
   providing a water material;
   finding a site of where to install a manufacturing plant that will manufacture the composite material, the site is chosen based on the soil material that covers the site;
   analyzing the soil of the site to determine if the soil is adequate to make the composite material;
   choosing the site if the soil on the site is thirty percent of a clay soil, forty-five percent of a silt-type soil, and twenty-five percent of a coarse sand that is between three mm to 4 mm thick;
   preparing the soil so that is has a humidity that is from at least six percent to at most seven percent humidity;
   providing a mixer mill;
   mixing the soil and the solid conglomerate for at least five minutes in the mixer mill, thereby creating a soil and solid conglomerate mix, the soil and solid conglomerate mix consists of eighty-five percent of the soil and fifteen percent of the solid conglomerate material by weight;
   mixing the liquid conglomerate material with the soil and solid conglomerate mix for at least five minutes in the mixer mill at a humidity that is at least nine percent to ten percent moisture thereby creating the composite material, the composite material consists of eighty-five percent of the soil and solid conglomerate mix and fifteen percent of the liquid conglomerate material;
   providing an industrial press; and
   pressing the composite material in the industrial press at a pressure that is at least 2800 pounds per square inch to either form either a block, a brick, a tile, or a paver.

2. The method of manufacturing a composite material that is used to make blocks, bricks, tiles pavers of claim 1, the method comprises the step of placing either the block, the brick, the tile, or the paver in a setting area for a period of forty-eight hours and sprinkling either the block, the brick, the tile, or the paver with the water material.

* * * * *